(12) United States Patent
Masuhara

(10) Patent No.: US 6,440,333 B2
(45) Date of Patent: Aug. 27, 2002

(54) OPTICAL RECORDING MEDIUM, AND METHOD OF MANUFACTURING SAME

(75) Inventor: Shin Masuhara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/841,986

(22) Filed: Apr. 25, 2001

Related U.S. Application Data

(62) Division of application No. 09/252,921, filed on Feb. 19, 1999.

(30) Foreign Application Priority Data

Feb. 27, 1998 (JP) ............................................. 10-048071

(51) Int. Cl.$^7$ ............................ B29D 11/00; B29D 17/00
(52) U.S. Cl. ................................. 264/1.33; 264/1.37
(58) Field of Search ........................ 264/1.1, 1.37, 264/1.33, 106, 107, 2.5, 400, 482; 425/810

(56) References Cited

U.S. PATENT DOCUMENTS

| | | | | |
|---|---|---|---|---|
| 5,238,786 A | * | 8/1993 | Kashiwagi | |
| 5,346,654 A | * | 9/1994 | Kodaka et al. | 264/1.33 |
| 5,458,985 A | * | 10/1995 | Isono et al. | 425/385 |
| 5,494,782 A | * | 2/1996 | Maenza et al. | 264/25 |
| 5,667,658 A | * | 9/1997 | Koop et al. | |
| 6,207,247 B1 | * | 3/2001 | Morita | |

* cited by examiner

Primary Examiner—Mathieu D. Vargot
(74) Attorney, Agent, or Firm—Bell, Boyd & Lloyd LLC

(57) ABSTRACT

There are provided an optical recording medium and a method of manufacturing the optical recording medium. The optical recording medium has a pattern of microscopic depressions and projections molded thereon with a high fidelity of replication. The method of manufacturing the optical recording medium comprises the steps of forming a photoresist layer on a substrate; exposing a predetermined area of the photoresist layer formed on the substrate to form a plurality of trains of depressions in the photoresist layer; removing the photoresist layer between the adjoining depression trains to form a master; plating the master with a metal; separating the metal coating to form a master stamper; replicating the master stamper repeatedly an odd number of times to form a mother stamper; replicating the mother stamper to form a resin substrate; and forming at least a light-transparent layer on a surface of the resin substrate on which the mother stamper is replicated. The method can mold a pattern of microscopic depressions and projections with a high accuracy.

6 Claims, 9 Drawing Sheets

OPTICAL RECORDING MEDIUM, AND METHOD OF MANUFACTURING SAME

This application is a division of application Ser. No. 09/252,921, filed Feb. 19, 1999.

BACKGROUND OF THE INVENTION

1. Field of the Invention

The present invention relates to an optical recording medium comprising a substrate having formed thereon a pattern of depressions and projections and a light-transparent layer formed on the substrate, and a method of manufacturing the optical recording medium.

2. Description of Related Art

As typical conventional optical recording media from or into which data is read or written using a light, ones shaped to have a generally disc-like form, so-called optical discs, are well known of which an optical disc substrate is formed from a synthetic resin such as polycarbonate or similar. The optical discs include a read-only type from which a signal already recorded therein can be read, a write-once type into which a signal can be recorded only once, and a rewritable one into which a signal can be recorded more than once.

The read-only type optical disc comprises an optical disc substrate having a pattern of microscopic depressions (so-called "pits") formed on a surface thereof in the direction of track, and a reflective layer provided on the disc surface on which the pit pattern is formed. Namely, the optical disc has a signal recorded as a pattern of pits formed in the direction of a track. For reading a signal recorded as a bit pattern from this read-only type of optical disc, the disc is irradiated with a reading light from a surface thereof opposite to the surface on which the bit pattern is formed. The reading light is reflected at the reflective layer, and a return light (reflected reading light) is detected to read the signal.

Also in this optical disc, a diffracted light from the surface on which the pits are formed is detected for maintaining the spot of light from a source accurately on the track (so-called tracking).

On the other hand, the optical discs of the write-once and rewritable types comprise each an optical disc substrate having formed thereon concentric or spiral depressions (so-called groove) and projections (so-called lands) formed between adjacent grooves, recording layer provided on the substrate, and a reflective layer provided on the recording layer. In the optical discs of these types, a signal is written on the recording layer formed on the grooves and/or lands. Also in these write-once and rewritable optical discs, pit patterns as additional signals such as disc properties, addresses, etc. are formed between grooves adjacent to each other in the direction of track.

When these optical discs are played, a reading light is irradiated onto the recording layer formed on the lands and/or grooves from on a surface thereof opposite to a surface on which the pits and grooves are formed, thereby forming recording marks on the recording layer. For reading the optical discs of these types, a reading light is irradiated as in the read-only type optical disc, and a return light from the disc is detected.

Also in these write-once and rewritable types of optical discs, a return light reflected from the groove, for example, is detected for the purpose of tracking.

The read-only, write-once and rewritable optical discs (will be referred to as "optical disc" hereinunder) are formed by an injection melding using a stamper having formed thereon projections and depressions which will provide pits and grooves on the optical disc. More specifically, a synthetic resin such as polycarbonate is injection-molded to form a transparent substrate having pits and grooves formed thereon. A reflective layer, etc. are formed on the transparent optical disc substrate to form an optical disc. In the write-once and rewritable optical discs, a recording layer is formed between the transparent optical disc substrate and the reflective layer.

A recent tendency in this field of art is to decrease the diameter of the spot of light focused on the optical disc in order to attain a higher recording density. Generally, this object can be attained by using a light of shorter wavelength and an objective lens of a larger numerical aperture (NA).

In case the diameter of the spot of light focused on the optical disc is decreased for a higher recording density, however, the transparent optical disc substrate has to be increased in thickness. This is because as the NA of the objective lens is increased, the allowance of an aberration caused by a tilt angle, which the disc surface or plane forms with respect to the optical axis of an optical pickup, is smaller. Also, the thicker a disc portion through which a reading light is transmitted, the larger the aberration due to the tilt angle will become.

Therefore, the distance between a light-incident surface and signal layer of the optical disc is decreased to accommodate the decreased diameter of the spot of light focused on the optical disc.

In the above-mentioned optical disc, however, it is difficult to mold a pattern of depressions and projections on an optical disc substrate having a thickness of 0.3 mm or less, for example. Further, even if the molding is possible, the optical disc substrate is likely to warp, which will result in a difficulty in forming thereon layers such as recording layer, reflective layer, etc. Moreover, if the optical disc substrate having such a thickness, the user will not be able to easily handle an optical disc made from the optical disc substrate.

Therefore, there has so far been proposed an optical disc comprising a transparent disc substrate having a pattern of depressions and projections formed thereon, at least a reflective layer formed on the disc substrate, and a light-transparent layer formed above the reflective layer so that a light of a predetermined wavelength can be incident through the light-transparent layer to read and/or write data from and/or into the optical disc. This type of optical disc will be referred to as "read-from-rear optical disc" hereinunder for the convenience of description.

In this read-from-rear optical disc, a recording layer is formed between the reflective and light-transparent layers.

In the read-from-rear optical disc, the light-transparent layer can be formed very thin compared with the optical disc substrate having depressions and projections formed thereon. Thus, even with a light of a larger wavelength and an objective lens of a larger NA, read and write of a signal can be made accurately with respect to the optical disc without the above-mentioned problems.

Even in the aforementioned read-from-rear optical disc, however, the transparent optical disc substrate is formed by an injection molding using a stamper having formed thereon a pattern of projections and depressions which will provide pits and grooves on the optical disc substrate. To prepare the stamper, first a photoresist layer is formed over a glass substrate, and a predetermined area of the photoresist layer is exposed to a light, thereby providing a glass master having provided thereon a predetermined pattern of depressions and projections formed from the unexposed photoresist layer remaining on the glass substrate. Next, the glass master is plated with nickel or similar to form a stamper.

Therefore, to form a pattern of pits/grooves and lands on the transparent optical disc substrate with a high accuracy for this read-from-rear optical disc, it is necessary to form a pattern of projections and depressions with a correspondingly high accuracy and also replicate the pattern accurately to the optical disc substrate.

For smaller pits and grooves to attain a higher recording density, it is more difficult to replicate the pattern of projections and depressions on the stamper to the optical disc substrate with a high accuracy. For instance, for microscopic projections formed on one main surface of the transparent optical disc substrate, corresponding microscopic depressions shall be formed on the stamper. Therefore, a resin has to be filled or charged in such microscopic depressions on the stamper.

It is conceivable that when producing an optical disc, a resin of a lower viscosity could be filled into the microscopic depressions with a higher efficiency and a higher accuracy of replication. Actually, however, it is difficult to fully charge such a lower-density resin into microscopic depressions. Namely, it is not possible to mold pits with a high accuracy.

An experiment to prove the above was done as will be discussed below. In the experiment, polycarbonate was used as a resin to be charged into microscopic depressions. It was injection-molded with a mold temperature changed to change the temperature of the resin. The mold temperatures used in this experiment were in three kinds: 120, 125 and 130° C.

The injection molding was done using a stamper adapted to form grooves of 0.85 $\mu$m in track pitch and 120 nm in depth. The accuracy of replication of the grooves thus molded was measured. The result of the measurement is shown in FIG. 1. In FIG. 1, the vertical axis indicates a groove depth (nm) and the horizontal axis indicates a ratio (%) between groove width in the stamper and track pitch. That is, the horizontal axis in FIG. 1 indicates a ratio in area of the grooves over the stamper.

As seen from FIG. 1, a higher mold temperature provides a higher accuracy of replication. As also known from FIG. 1, however, even at a high mold temperature, the accuracy of replication is lower with a smaller area of the grooves over the stamper. This means that for example, with depressions formed intermittently in the direction of track on the stamper correspondingly to pits on an optical disc substrate, it is difficult to form microscopic pits. Also if the mold temperature is too high, a molded optical disc substrate will warp very much so that the spot of a light such as reading light cannot be just focused even if the projections formed on a stamper have been replicated on the optical disc substrate with a high accuracy of replication. Furthermore, a mold at a high temperature will be expanded itself, which will cause the molding machine to malfunction. If the mold is thermally expanded too much, the moving piece of the mold will incur a so-called galling with a result that the molding machine will possibly damaged. Therefore, the upper limit of the mold temperature can be said to be about 130° C.

By the way, the read-from-rear optical disc had better to have recording marks formed on portions of the transparent optical disc substrate that are convex as viewed from the light-transparent layer. Also, the upper surfaces of those projecting or convex portions should preferably be flush with the flat surface of the glass master. In the read-from-rear optical disc, the projecting or convex portions are used as a recording area, thereby increasing the written or read amount of signal and improving the writing and reading characteristics.

In the read-from-rear optical disc, microscopic projections corresponding to the pits on the aforementioned optical disc are formed in line with the portions being convex as viewed from the light-transparent layer, namely, in the direction of recording track. That is to say, the read-from-rear optical disc has additional signals such as disc properties, addresses, etc. written thereon as these microscopic projections.

For a read-from-rear optical disc having formed thereon microscopic grooves and projections for a higher recording density, it is necessary to form the microscopic projections with a higher accuracy. For molding such microscopic projections, however, a stamper having corresponding microscopic depressions formed thereon has to be used. In this case, the accuracy of replication will be considerably lower for the above reasons.

The manufacture of the read-from-rear optical disc is disadvantageous in that the projections formed as additional signals cannot be replicated with a high accuracy, which will lead to a low yield and thus the additional signals could not be read accurately from the corresponding projections not precisely replicated.

SUMMARY OF THE INVENTION

Accordingly, the present invention has an object to overcome the above-mentioned drawbacks of the prior art by providing an optical recording medium having a pattern of microscopic depressions and projections and lands formed with a high accuracy of replication, and an optical recording medium manufacturing method capable of accurately forming microscopic depressions and projections on an optical recording medium.

The above object of the present invention can be attained by providing an optical recording medium comprising a substrate and at least a light-transparent layer provided on the substrate, and with respect to which a signal is written and/or read by a light of a predetermined wavelength irradiated from above and through the light-transparent layer;

the substrate having formed thereon projections being convex as viewed from the light-transparent layer and depressions positioned in line with the projections and deep from a same height as the main surfaces of the projections.

In the optical recording medium according to the present invention, the depressions are formed in line with the projections. In the recording medium, the depressions write additional signals, etc. Since formed with a high accuracy of replication, the depressions have each a desired shape. Therefore, the signals can be read accurately and positively from the depressions on this optical recording medium.

The above object of the present invention can also be attained by providing a method of manufacturing the optical recording medium according to the present invention, comprising the steps of:

forming a photoresist layer on a substrate;

exposing a predetermined area of the photoresist layer formed on the substrate to form a plurality of trains of depressions in the photoresist layer;

removing the photoresist layer between the adjoining depression trains to form a master;

plating the master with a metal;

separating the metal coating to form a master stamper;
replicating the master stamper repeatedly an odd number of times to form a mother stamper;
replicating the mother stamper to form a resin substrate; and
forming at least a light-transparent layer on a surface of the resin substrate on which the mother stamper has been replicated.

In the optical recording medium manufacturing method according to the present invention, a plurality of trains of depressions disposed in line is formed and the photoresist layer between the adjoining depressions is removed to form a master. Therefore, the photoresist layer remaining not removed on the substrate is formed as microscopic depressions. Namely, the method of the present invention will form microscopic depressions on the master. Also in this method, since the master stamper is formed by replicating the master, it will have formed thereon a pattern of projections and depressions corresponding depressions and projections, respectively, on the master. Furthermore, in this method, since the mother stamper is formed by replicating the master stamper repeatedly an odd number of times, it will have an inverted one of the pattern of depressions and projections formed on the master stamper. Therefore, the mother stamper will have the same pattern of depressions and projections as that on the master.

Moreover, in this method, since the mother stamper is used to mold the resin substrate, the latter will have replicated thereon the pattern of depressions and projections formed on the mother stamper. Namely, the resin will be applied onto the mother stamper having projections corresponding to the microscopic projections formed on the master. The projections on the mother stamper are replicated to the substrate, resulting in depressions on the transparent substrate.

In the optical recording medium manufacturing method according to the present invention, the mother stamper is formed by replicating the master tamper repeatedly the odd number of times. This means, a stamper or mold formed by replicating the master stamper once is used as a mother stamper, alternatively a stamper formed by replicating the master stamper once is used for a second replication, a stamper formed by the second replication is used for a third replication, and a stamper formed by the third replication is used as a mother stamper. That is to say, the replication of the master stamper is counted as the first replication. A stamper obtained by this first replication is used for a next replication, and a stamper formed by a final odd replication is used as the mother stamper.

In the method of the present invention, grooves may be formed in line with the train of depressions.

In this case, the grooves formed in line with the same train of depressions on the master will be grooves on the mother stamper as well. Therefore, an optical recording medium manufactured by this method will have projections corresponding to the grooves on the mother stamper.

Also, the bottoms of the grooves and depressions should preferably be formed from the substrate.

In this case, since the bottoms of the grooves and depressions are defined by the substrate surface, portions of the resin substrate molded correspondingly to the bottoms of the grooves and depressions will be replications of the substrate surface. Namely, this method will permit to manufacture an optical recording medium having portions formed by replication of the substrate surface.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
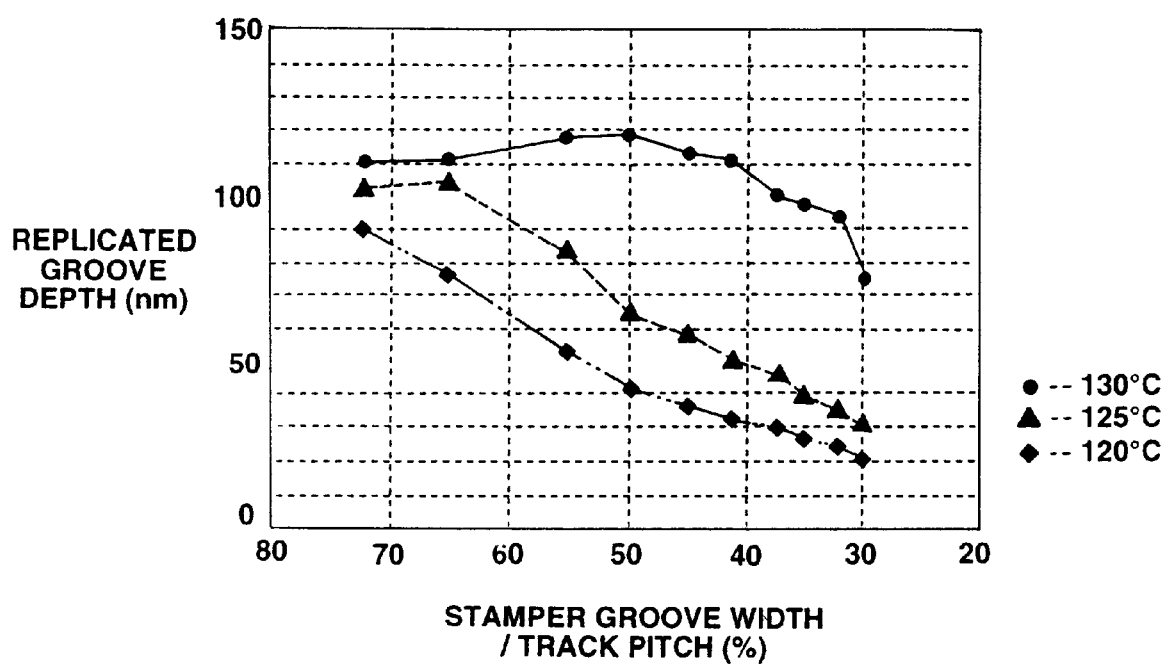
FIG. 1 shows characteristic curves of the relation between the ratio of the width of groove on stamper and the track pitch on disc substrate, and the depth of a replicated groove, measured with the resin temperature changed.
Figure 2:
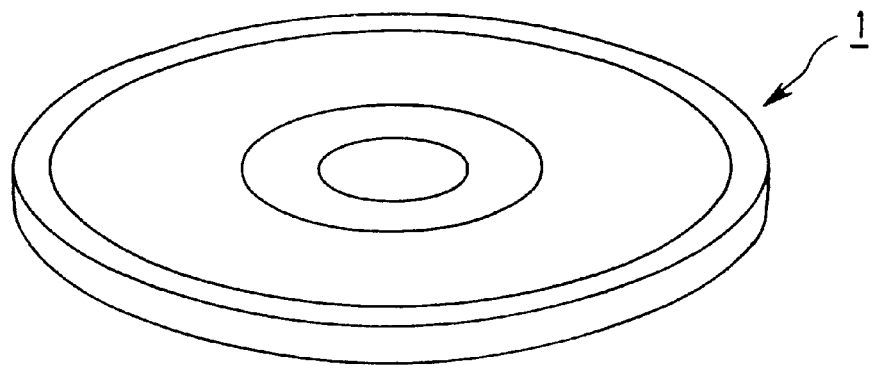
FIG. 2 is a perspective view of an optical disc as an example of the optical recording medium according to the present invention.

The optical recording medium according to the present invention will be described concerning a one shaped to have a generally disc-like form, by way of example, as shown in FIG. 2. The optical disc is generally indicated with a reference 1. However, it should be noted that the present invention is not limited to such an optical disc 1 but it may be applied to card- and sheet-shaped optical recording media.

Figure 3:
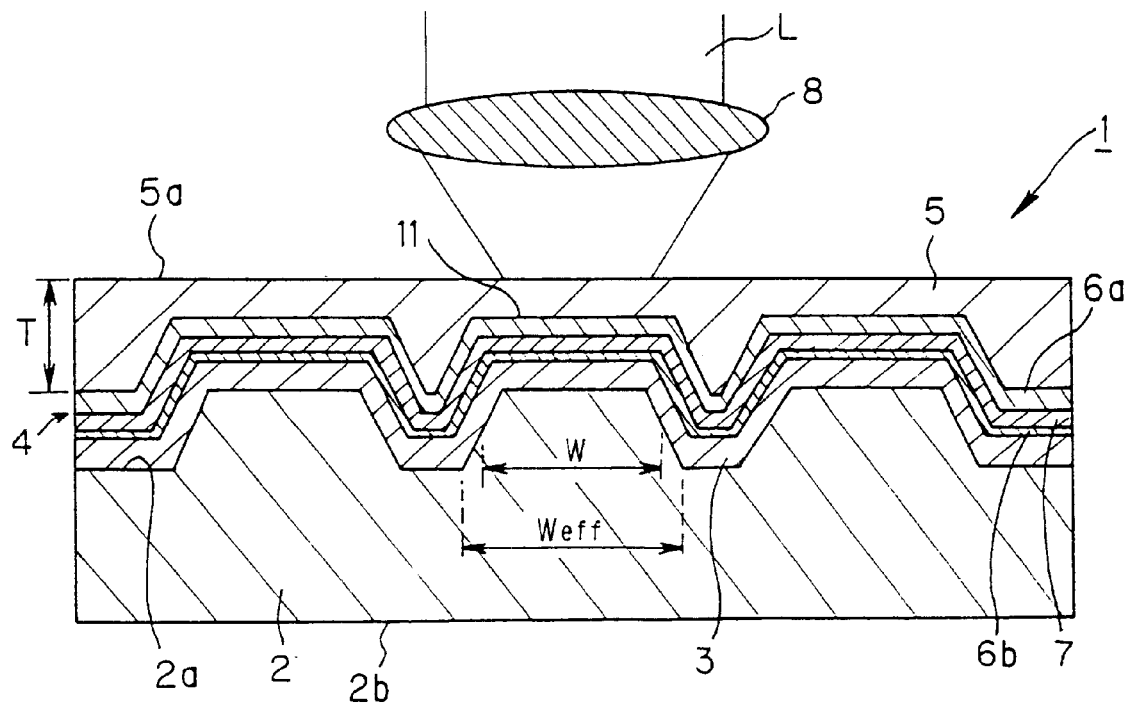
FIG. 3 is a sectional view of an essential portion of the optical disc in FIG. 2.

As shown in FIG. 3, the optical disc 1 comprises a substrate 2 having a pattern of depressions and projections formed on a main surface 2a thereof, a reflective layer 3 provided on the main surface 2a, a recording layer 4 provided on the reflective layer 3, and a light-transparent layer 5 provided on the recording layer 4. In this optical disc 1, the reflective and recording layers 3 and 4 are formed to follow the shapes of the pattern of depressions and projections formed on the substrate 2. Also in this optical disc 1, the light-transparent layer 5 is formed to cover the pattern of depressions and projections formed on the substrate 2, and one main surface 5a of the light-transparent layer 5 is flat. Also the substrate 2 has another main surface 2b opposite to the main surface 2a thereof and which is also flat. Thus the other main surface 2b of the substrate 2 and the main surface 5a of the light-transparent layer 5 serve as opposite flat surfaces, respectively, of the optical disc 1.

Further, this optical recording medium may be a phase-change type optical disc. In this case, the optical disc 1 comprises a recording layer 4 consisting of a pair of dielectric layers 6a and 6b and a recording layer 7 sandwiched between the dielectric layers 6a and 6b. The dielectric layers 6a and 6b are made from a one selected from nitride, oxide and sulfide of a metal or metalloid such as Al, Si, or similar. The recording layer 7 is made from a phase-change material often used to produce a phase-change optical disc, namely, a simple calcogen or calcogenite or calcogen compound, such as a one selected from simple Te and Se or calcogenites of them, namely, GeSbTe, GeTe, InSbTeAg, $Bi_2Te_3$, BiSe, $Sb_2Se_3$, $Sb_2Te_3$, etc. It should be appreciated that write and read is made with respect to this optical disc 1 by irradiating a light L of a predetermined wavelength to the recording layer 7 from on the main surface 5a of the light-transparent layer 5, as will be further described later. That is, the light-transparent layer 5 is disposed in the optical disc 1 to face an objective lens 8 of a disc drive. The light L of the predetermined wavelength is projected through the objective lens 8 onto the recording layer 7.

Figure 4:
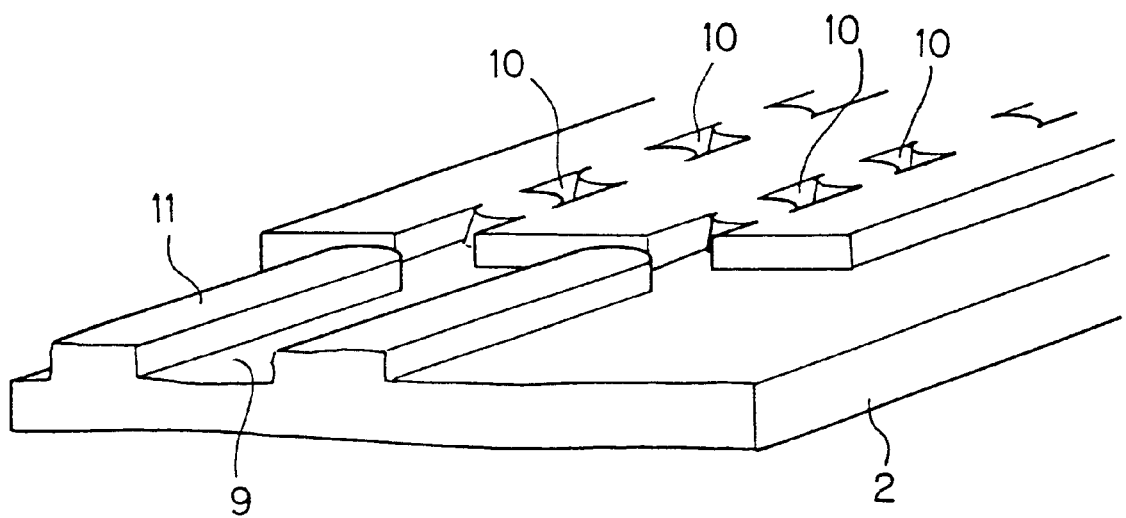
FIG. 4 is a perspective view of the essential portion of the substrate of the optical disc.
Figure 5:
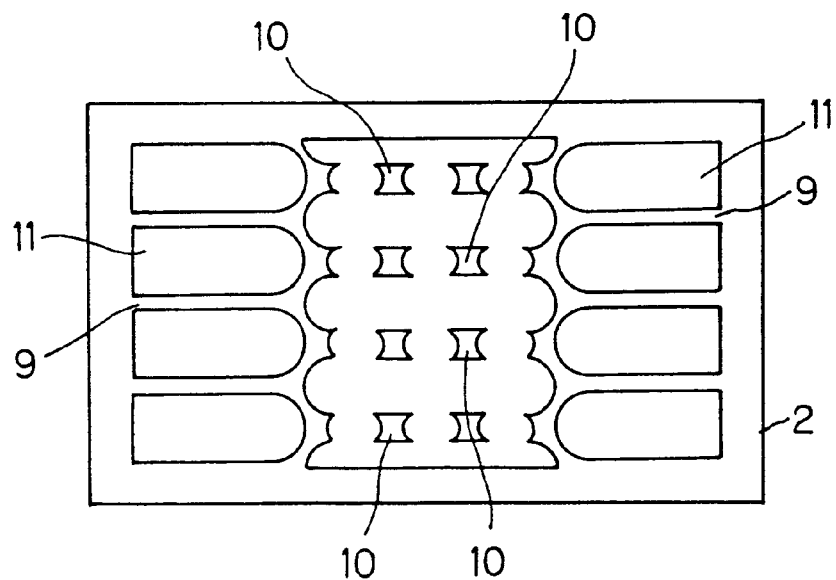
FIG. 5 is a plan view of the optical disc substrate.

As shown in FIGS. 4 and 5, the optical disc 1 has provided on the substrate 2 grooves 9 formed generally circumferentially at a predetermined pitch and pits 10 formed at a predetermined pitch. Namely, the substrate 2 of the optical disc 1 has a pattern of grooves 9 and pits 10. Further, projections, namely, lands 11, are formed between a grooves 9 adjoining each other in the direction of track width.

Further, the optical disc 1 has the pits 10 formed in a predetermined area of the substrate 2. The pits 10 form together a train directed in line with the land 11. In the optical disc 1, each of the pits 10 has a same depth as the groove 9 as measured from the main surface of the land 11.

However, the optical recording medium according to the present invention is not limited to a one such as having the phase-change type recording layer 4 as in the aforementioned optical disc 1, but may have an magneto-optical or organic-dye type recording layer. Also the optical recording medium according to the present invention is not limited to a one having the recording layer 4, but may not have any recording layer. In this case, the optical recording medium is a read-only recording medium and pits formed on a substrate thereof write signals. Namely, in this optical recording medium, pits are formed in a train oriented in the direction of track and the train of pits writes signals.

With respect to the optical disc 1 constructed according to the present invention as having been described in the above by irradiating a light of a predetermined wavelength is irradiated to the optical disc 1 to write a signal, and a light of a different wavelength is irradiated to read a written signal from the optical disc 1.

In this optical disc 1, a writing light is irradiated from above and through the light-transparent layer 5 to write a signal on the main surface of the land 11. Therefore, the writing light is irradiated in such a manner that its spot scans over the main surface of the land 11 of this optical disc 1.

As mentioned above, this optical disc 1 has a phase-change type recording layer 7 which is initially crystalline. When a writing light is irradiated onto a desired position on the recording layer 7, the light-exposed portion of the recording layer 7 is heated and changes from the crystalline to an amorphous status. Thus, an amorphous recording mark can be formed on the initially-crystalline recording layer 7 to write a signal. Therefore, the writing light should have such an intensity as will provide a sufficient energy to change the crystalline recording layer 7 to an amorphous status.

Thus, an amorphous recording mark is formed on the main surface of the crystallized land 11 of this optical disc 1. By irradiating a reading light of a predetermined wavelength to the main surface of the land 11 of the optical disc 1, it is possible to read a signal written as the above-mentioned recording mark. At this time, the reading light is irradiated in such a manner that its spot scans over the main surface of the land 11 in the direction of track.

For reading this optical disc 1, a reflected or return light of the irradiated reading light is detected. At this time, the irradiated reading light is reflected with a reflectance depending upon whether the recording layer 7 is crystalline or amorphous. Therefore, the amorphous recording mark can be detected through detection of the return light of the reading light. Note that the reading light should be relatively weak to such an extent that the light will not cause any phase-change of the recording layer 7.

Furthermore, by irradiating a reading light also to a plurality of pits 10 in a train in a predetermined area on the optical disc 1, a signal written in this area can be read. At this time, the reading light is irradiated in such a manner that its spot scans over the main surface of the land 11, and then irradiated for the spot to scan over the plurality of pits 10 formed in series in the predetermined area.

When the reading light is irradiated to the pit 10, the return light from the bottom of the pit 10 is out of phase, so that the intensity of the return light will be lower. Thus, for reading this optical disc 1, a reading light is irradiated to a train of the pits formed in series and a reflected component of the reading light is detected to read a signal written as the pits 10.

Note that additional signals such as properties, addresses, etc. of the optical disc 1 can be written as these pits 10.

For manufacture of this optical disc 1, a stamper formed to have a predetermined shape is used to mold a resin, thereby forming pits 10 being microscopic depressions on the substrate 2. Therefore, the projections on the stamper can be replicated with a high accuracy to form the pits 10 on this optical disc 1.

Thus, the optical disc according to the present invention can have additional signals such as disc properties, addresses, etc. accurately written thereon. Therefore, the optical disc has a high quality for positive reading of such additional signals.

Also the optical disc 1 is irradiated with a writing light and reading light (will be referred to simply as "light" hereinunder) from above and through the light-transparent layer 5 as shown in FIG. 3. Thus, the light is passed through the light-transparent layer 5 onto the recording layer 7, and reflected by the reflective layer 3. In other words, in this optical disc 1, the irradiated light has only to pass by a portion of the optical disc 1 corresponding to the thickness of the light-transparent layer 5.

Figure 6:
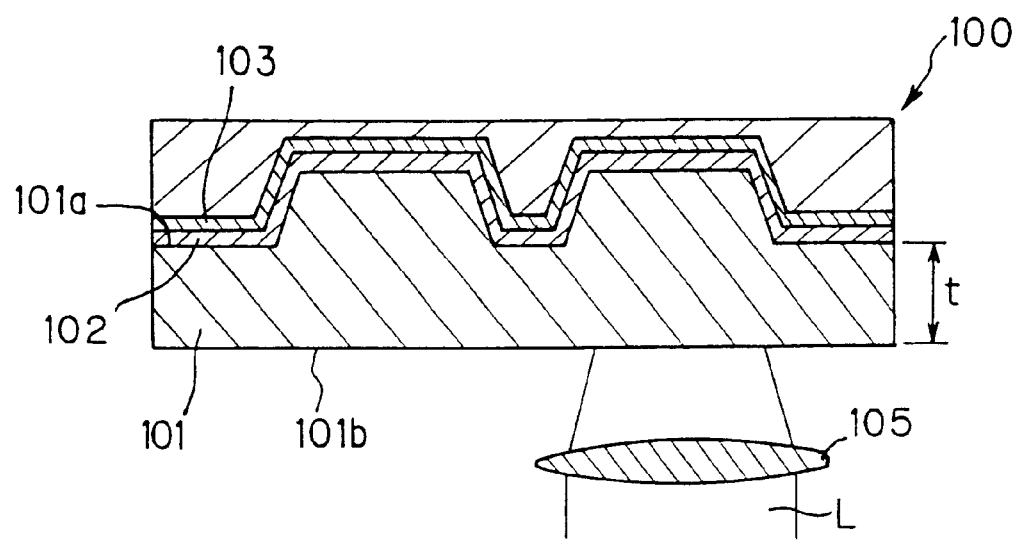
FIG. 6 is a sectional view of the essential portion of a conventional optical disc, showing write/read with respect to the conventional optical disc.

FIG. 6 shows a sectional view of the essential portion of a conventional optical disc. The optical disc is generally indicated with a reference 100. It comprises a substrate 101 having a pattern of depressions and projections formed on one main surface thereof 101a, a recording layer 102 provided on the one main surface 101a of the substrate 101, a reflective layer 103 provided on the recording layer 102, and a protective layer 104 provided on the reflective layer 103. For reading or writing this optical disc 100, a light is irradiated from on another main surface 101b of the substrate 101. Therefore, the light has to be passed through a portion of the optical disc 1 corresponding to thickness t of the substrate 101.

By the way, the diameter φ of the spot of light is a function of a wavelength λ of the light and a numerical aperture NA of an objective lens as shown below:

$$\phi = 1.22 \times (\lambda/NA) \quad (1)$$

Generally, for a higher recording density of an optical disc, the diameter φ of the spot of light has to be decreased. For this purpose, the wavelength λ of the light has to be decreased (shorter wavelength) and the numerical aperture NA is increased (greater NA), as seen from the expression (1).

When the numerical aperture is increased for a smaller diameter φ of the spot of light, irradiated light cannot be focused on a desired area in some cases if defocusing, substrate skew, uneven thickness of substrate, etc. takes place. To cope with this problem, the thickness t of the substrate 101 is decreased in the conventional optical disc 100.

However, if the thickness t of the substrate 101 of the conventional optical disc 100 is decreased, microscopic depressions and projections cannot easily be replicated to the substrate 101 and also the substrate 101 itself will easily warp. Therefore the substrate 101 of the conventional optical disc 100 can only be thinned to a certain limit. More specifically, the thickness t of the substrate 101 is on the order of about 0.6 mm. Thus, with an objective lens 105 of a large NA, read and write cannot be made accurately with respect to the conventional optical disc 100.

On the contrary, accurate write and read can be made with respect to the optical disc 1 according to the present invention, having been described in the foregoing, by a light irradiated through an objective lens 8 having a large NA as in the above since the light-transparent layer 5 can be thinned very much (this thickness is indicated with a reference T in FIG. 3). Namely, even when the substrate 2 of this optical disc 1 is molded to such a thickness as will cause no warp of the substrate 2, the light-transparent layer 5 can be thinned so much that a portion of the substrate 5 through which a light is passed can be formed very thin. More particularly, even with the objective lens 8 having a numerical aperture NA of 0.85 to 0.95, for example, accurate write and read can be assured by forming the light-transparent layer 5 having a thickness T of about 0.3 mm.

In this optical disc 1, a recording mark is formed on the main surface of a portion being convex as viewed from the light-transparent layer 5, namely, of the land 11. Also in the optical disc 1, a recording layer 7 formed on the land 112 has a width $W_{\mathit{eff}}$ which is larger than a width W of the land 11 as shown in FIG. 3 for the recording layer 7 is sandwiched between the reflective layer 3 and dielectric layers 6a and 6b on the substrate 2.

Figure 7:
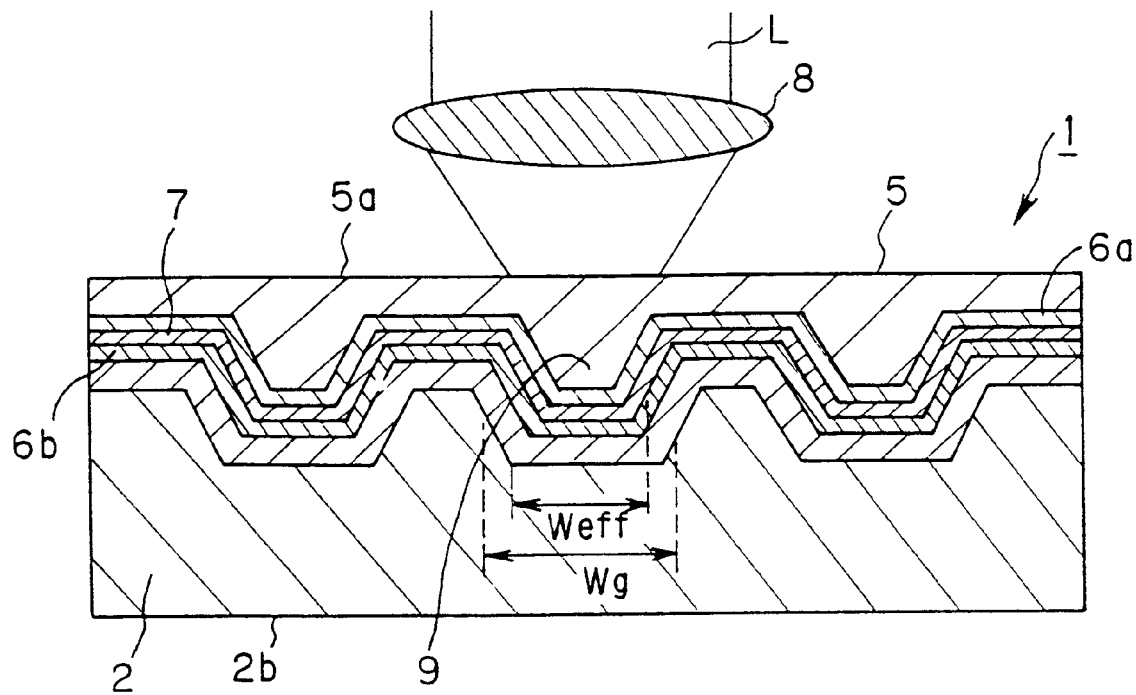
FIG. 7 is a sectional view of the essential portion of the optical disc according to the present invention, showing write as a portion being concave as viewed from the light-transparent layer.

On the other hand, when the recording mark is formed on the bottom of a portion of the substrate 2 being concave as viewed from the light-transparent layer 5, namely, the groove 9 of the substrate 2, as shown in FIG. 7, the recording layer 7 has the width $W_{\mathit{eff}}$ smaller than a width Wg of the groove 9.

Thus, when the recording mark is formed on the main surface of the land 11 as shown in FIG. 3, the carrier level of a reading signal can be better than when the recording mark is formed on the bottom of the groove 9, so that the CN ratio can be improved. At this time, to improve the CN ratio, the width Wg of the groove 11 may be increased for in-groove recording as shown in FIG. 7. However, if the track pitch is decreased for a higher recording density, a sufficient increase of the groove width Wg for a good CN ratio will be physically impossible.

Therefore, in an optical disc in which a light is irradiated from above and through the light-transparent layer 5, the writing and reading characteristic can considerably be improved by forming a recording mark on the main surface of the land 11.

The optical recording medium manufacturing method according to the present invention is applied to a manufacture of the aforementioned optical disc 1, for example.

Figure 8:
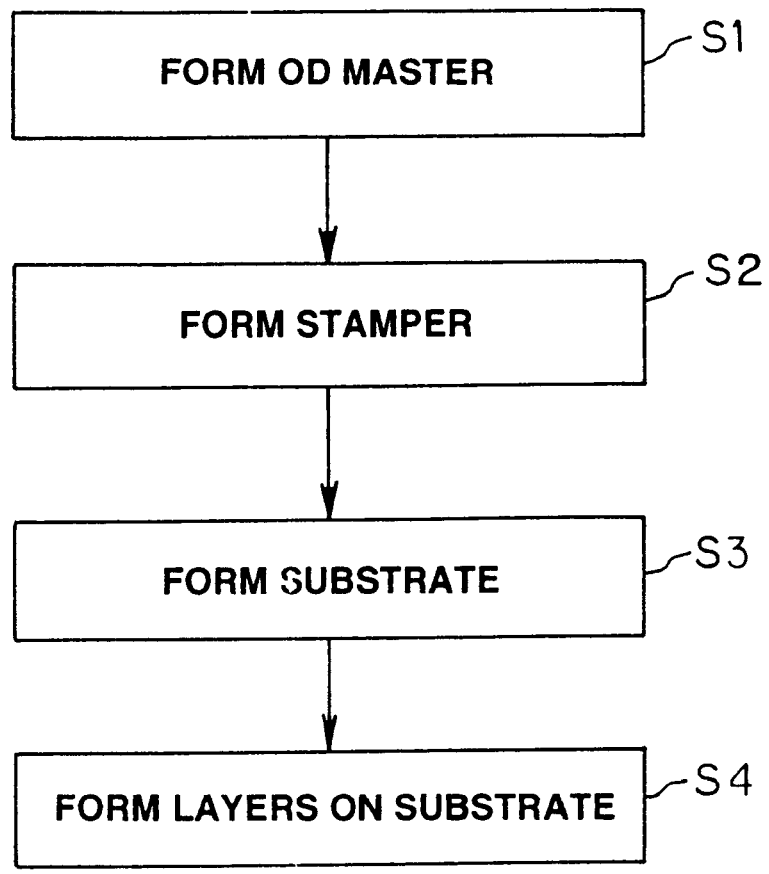
FIG. 8 is a flow chart of the processes in the method of manufacturing the optical recording medium according to the present invention.

The optical recording medium manufacturing method according to the present invention will be described herebelow with reference to FIG. 8. The method comprises an optical disc master forming step S1, stamper forming step S2, substrate forming step S3, and layer forming step S4. More particularly, at step S1, an optical disc master is formed to form a stamper. At step S2, the optical disc master is used to form a stamper. At step S3, the stamper is used to form an optical disc substrate by injection molding. Finally at step S4, layers such as reflective layer, etc. are formed on the substrate to produce an optical disc 1.

Figure 9:
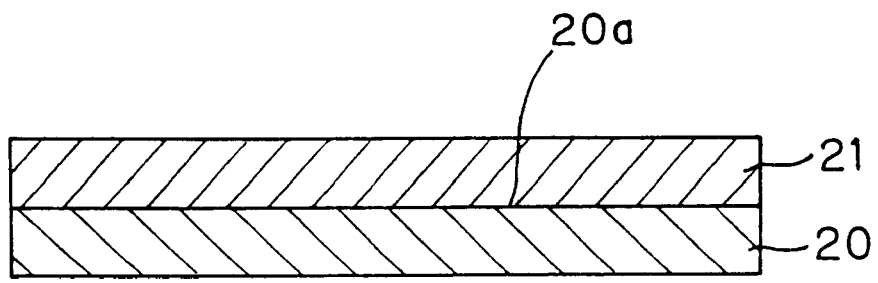
FIG. 9 is a sectional view of the essential portion of the optical recording medium or optical disc of the present invention, showing a photoresist layer formed on a glass substrate.

First at step S1, a photoresist layer 21 is formed to a predetermined thickness on one main surface 20a of a disc-like glass substrate 20 as shown in FIG. 9. At this time, the one main surface 20a of the glass substrate 20 is highly flattened and also mirror-finished to a high degree. The photoresist layer 21 is formed highly uniformly over the glass substrate 20, as will be discussed in further detail later, to define the depth of the grooves 9 and pits 10 by the thickness of the photoresist layer 21.

Figure 10:
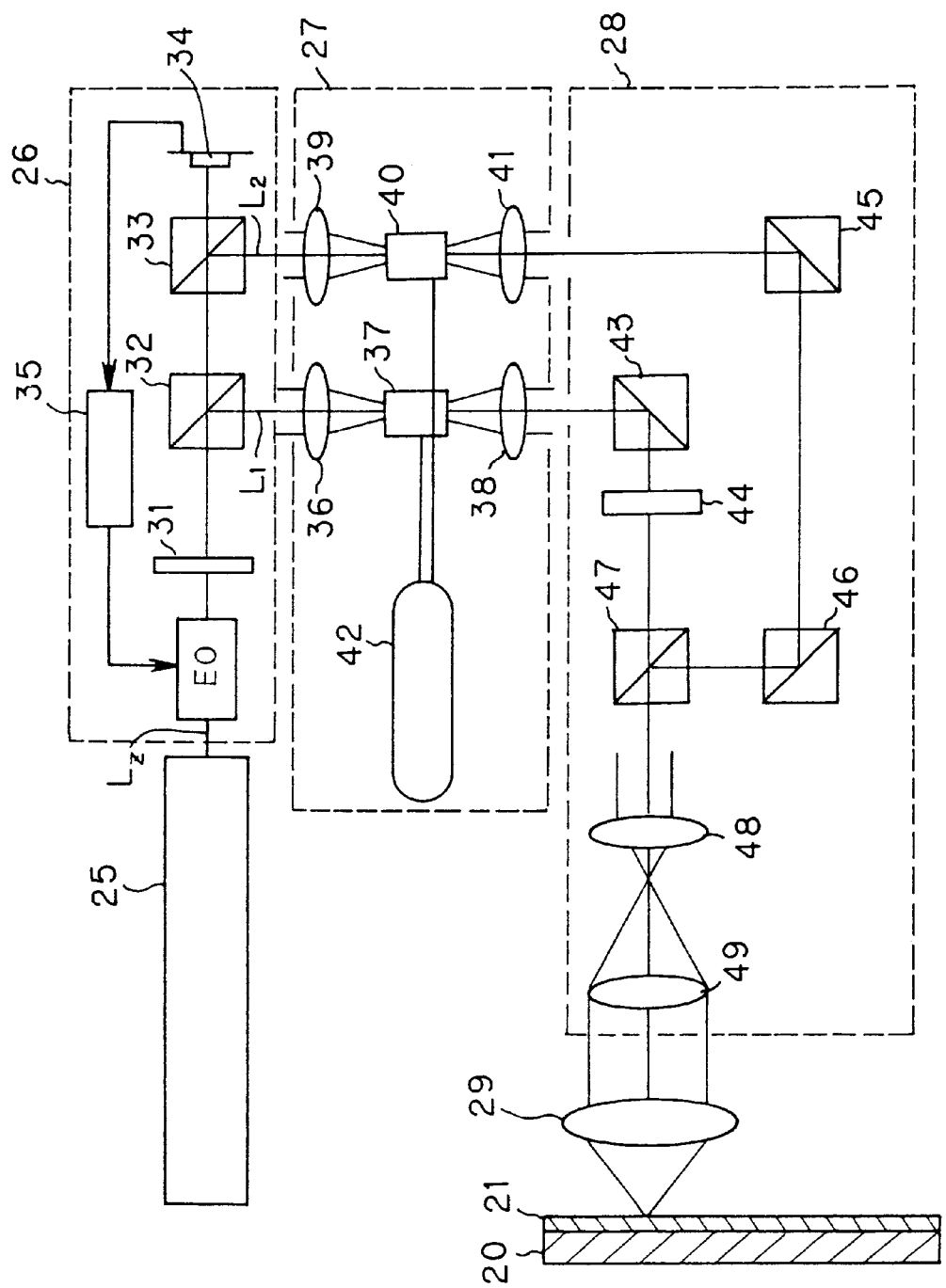
FIG. 10 shows the construction of an exposure system used to implement the method of the present invention.
Figure 11:
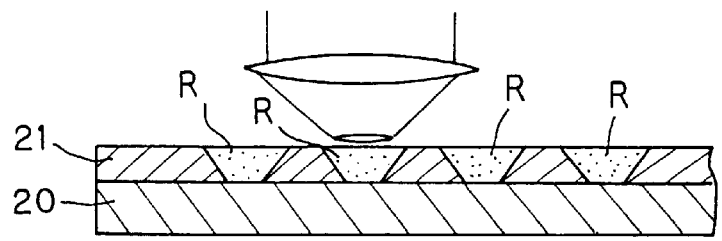
FIG. 11 is a sectional view of the essential portion of a glass substrate, showing an exposure of a predetermined area of the photoresist layer formed on the glass substrate.

Thereafter, an exposure system schematically shown in FIG. 10 is used to exposure predetermined areas R on the photoresist layer 21 formed on the spinning glass substrate 20 to pattern the photoresist layer 21 as shown in FIG. 11. This patterning is effected in such a manner that the photoresist layer 21 will remain on the glass substrate 20 correspondingly to the grooves 9 and pits 10 formed on the optical disc 1.

As will be seen from FIG. 10, the exposure system uses a so-called two-beam optical system to form two different spots of light on the photoresist layer 21. It comprises a laser source 25 to emit a laser beam, a controller 26 to control the intensity of a laser beam emitted from the laser source 25 and separate the laser light beam into two, a modulator 27 to modulate the separated laser beams, an adjuster 28 to join the separated laser beams together and adjust the diameter of the spot of laser beam, and an objective lens 29 disposed opposite to the photoresist layer 21.

The exposure system further comprises a turntable to support thereon the glass substrate 20 having the photoresist layer 21 formed thereon and spin the glass substrate 20 at a predetermined speed, and a controller to maintain a predetermine distance between the glass substrate 20 placed on the turntable and the objective lens 29. Both the turntable and controller are not illustrated.

The laser source 25 generates a Kr ion laser of a wavelength of λ=351 nm, for example. The laser beam emitted from the laser source 25 is incident upon the controller 26.

The controller 26 comprises an electro-optical crystalline element (will be referred to as "EO" hereinunder) 30 upon which the laser beam $L_Z$ emitted from the laser source 25 is incident, an analyzer 31 to detect a polarization of the laser beam $L_Z$ having passed through the analyzer 31, a first beam splitter 32 to receive the laser beam $L_Z$ having passed through the analyzer 31 and separate a first laser beam $L_1$ from the laser beam $L_Z$, a second beam splitter 33 to separate a second laser beam $L_2$ from other laser beam $L_Z$ than the separated first laser beam $L_1$, a photodetector 34 to detect other laser beam $L_Z$ than the separated first and second laser beams $L_1$ and $L_2$, and an output controller 35 to control the output of the laser beam $L_Z$ from the EO 30. Note that in this method, the first laser beam $L_1$ exposes each of areas of the photoresist layer 21 corresponding to the lands 11 and pit trains while the second laser beam $L_2$ exposes each of areas between the adjoining pit trains.

The controller 26 constructed as mentioned above receives at the RO 30 thereof the laser beam $L_Z$ from the laser source 25. Thus the EO 30 is adapted to modulate the laser beam $L_Z$ having come from the laser source 25 to a desired intensity. The laser beam $L_Z$ has the intensity thereof modulated by the EO 30, then the first laser beam $L_1$ is separated from the laser $L_Z$ by the first beam splitter 32 and the second laser beam $L_2$ is separated from the laser beam $L_Z$ by the second beam splitter 33.

Also, the controller 26 detects, by the photodetector 34, the intensity of the laser beam $L_Z$ from which the first and second laser beams $L_1$ and $L_2$ have been separated. The photodetector 34 is connected to an output controller 35 and provides the detected laser beam intensity signal to the output controller 35. Based on the laser beam intensity signal output from the photodetector 34, the output controller 35 controls the intensity of the laser beam output from the EO 30. That is, the controller 26 detects the laser beam $L_Z$ from the EO 30 by the photodetector 34 for feedback control of the laser intensity, so that a laser beam $L_Z$ having always a desired intensity will be provided from the EO 30.

The first and second leaser beams L1 and L2 separated by the controller 26 are incident upon the modulator 27. This modulator 27 comprises a first lens 36, first acousto-optical modulator 37 and a second lens 38, disposed in this order on the optical path of the first laser beam $L_1$; a third lens 39, second acousto-optical modulator 40 and a fourth lens 41, disposed in this order on the optical path of the second laser beam $L_2$; and a signal controller 42 connected to the first and second acousto-optical modulators 37 and 40.

At the modulator 27 constructed as discussed in the abolve, the first laser beam $L_1$ is collimated by the first lens 36 to a predetermined spot diameter and incident upon the first acousto-optical modulator 37. Also the second laser beam $L_2$ is collimated by the third lens 39 to a predetermined spot diameter and incident upon the second acousto-optical modulator 40. Based on a control signal from the signal controller 42, the first and second acousto-modulators 37 and 40 control the intensity of the first and second laser beams $L_1$ and $L_2$, respectively, incident upon them.

More particularly, when the control signal output from the signal controller 42 is a binary signal, namely, having two values "0" and "1", the first and second laser beams $L_1$ and $L_2$ are turned on or off. Note that the first and second acousto-optical modulators 37 and 40 should preferably be operable in a bandwidth of several tens MHz.

In this method, the first laser beam $L_1$ irradiated to each of areas of the photoresist layer 21 corresponding to the lands and pit trains, while the second laser beam $L_2$ is irradiated to each of areas of the photoresist layer 21 corresponding to the areas between the plurality of pit trains. Thus, the first acousto-optical modulator 37 turns on and off the first laser beam $L_1$ so that the first laser beam $L_1$ will expose each of the areas of the photoresist layer 21 corresponding to the lands 11 and each of areas corresponding to the areas between the pits 10 in the trains formed in parallel in the direction of track. Also, the second acousto-optical modulator 40 turns on and off the second laser beam $L_2$ so that the second laser beam $L_2$ will expose each of the areas of the photoresist layer 21 corresponding to the areas between the pit trains.

As mentioned above, the first and second laser beams $L_1$ and $L_2$ turned on and off at desired times are incident upon the adjuster 28 through the second and fourth lenses 38 and 41, respectively. The adjuster 28 comprises a third beam splitter 43 and half-wave plate 44 disposed in this order on the optical path of the first laser beam $L_1$; a fourth beam splitter 45 and fifth beam splitter 46 disposed in this order on the optical path of the second laser beam $L_2$; a polarized beam splitter (will be referred to as "PBS" hereinunder) 47 to join the first and second laser beams $L_1$ and $L_2$ togther; and a fifth lens 48 and sixth lens 49 disposed on the optical paths of the first and second laser beams $L_1$ and $L_2$ having passed through the PBS 47. In this adjuster 28, the half-wave plate 44 is connected to a signal output controller (not shown).

In the adjuster 28, the half-wave plate 44 serves to turn the polarized direction of the first laser beam $L_1$ by 2θ where θ is an angle defined between a predetermined direction (crystallographic axial direction) in the plane of the half-wave plate 44 and the polarized direction of the first laser beam $L_1$. The fifth beam splitter 46 allows the second laser beam $L_2$ to be tilted a predetermined angle for incidence upon the PBS 47. Further, the PBS 47 allows to fully pass a laser beam polarized linearly in a predetermined direction while completely intercepting a laser beam polarized linearly in a direction perpendicular to the predetermined direction.

In the adjuster 28 constructed as in the above, a component of the first laser beam $L_1$ reflected by the third beam splitter 43 is incident upon the half-wave plate 44 and a component of the laser beam $L_1$ having passed through the third beam splitter 43 is incident upon a monitor (not shown). Also, a component of the second laser beam $L_2$ reflected by the fourth beam splitter 45 is incident upon the fifth beam splitter 46 and a component of the laser beam $L_2$ having passed through the fourth beam splitter 45 is incident upon a monitor (not shown).

By controlling to a desired value the angle θ defined between the crystallographic axis of the half-wave plate 44 and the polarized direction of the first laser beam $L_1$, the first laser beam $L_1$ will be polarized in a desired direction. Thus, by polarizing the first laser beam $L_1$ in a direction deviated a predetermined amount from the direction in which the PBS 47 allows the laser beam $L_1$ to full pass, the first laser beam $L_1$ can be passed through the PBS 47 at any desired ratio within a range of 0 to 100%. Namely, by adjusting the polarized direction of the first laser beam $L_1$ incident upon the BPS 47, it is possible to adjust the intensity of the laser beam $L_1$ passing through the BPS 47.

A component of the second laser beam $L_2$ reflected by the fifth beam splitter 46 will be incident upon the PBS 47. At this time, before incident upon the PBS 47, the second laser beam $L_2$ is tilted a predetermined amount with respect to the angle of incidence of the first laser beam $L_1$ upon the PBS 47. That is to say, by tilting the PBS 47 through a predetermined angle, the second laser beam $L_2$ is tilted from the incidence angle of the first laser beam $L_1$.

Further, the adjuster 28 detects, by the monitor, the first laser beam $L_1$ having passed through the third beam splitter 43 and also the second laser beam $L_2$ having passed through the fourth beam splitter 45. Namely, the adjuster 28 can detect the intensity of the first and second laser beams $L_1$ and $L_2$. Thus, the adjuster 28 can compare in intensity the first and second laser beams $L_1$ and $L_2$ with each other, and based on the result of comparison, it can adjust the intensity of the first laser beam $L_1$ incident upon the PBS 47 as mentioned above.

Moreover, the first and second laser beams $L_1$ and $L_2$ are joined together by the PBS 47 and incident upon the fifth and sixth lenses 48 and 49 which enlarge the optical paths of the first and second laser beams $L_1$ and $L_2$, respectively. The first and second laser beams $L_1$ and $L_2$ are enlarged by the fifth and sixth lenses 48 and 49, respectively, and then incident upon the objective lens 29.

In this exposure system, the objective lens 29 condenses the incident first and second laser beams $L_1$ and $L_2$ and project them as spots of a predetermined diameter onto the photoresist layer 21. Since the incident angle of the first laser beam $L_1$ upon the PBS 47 is different from that of the second laser beam $L_2$, the first and second laser beams $L_1$ and $L_2$ will be incident upon the objective lens 29 at different angles of incidence, respectively. Therefore, in this exposure system, the first and second laser beams $L_1$ and $L_2$ will be irradiated, being deviated from each other radially of the glass substrate 20, onto the photoresist layer 21. The objective lens 29 will project the first and second laser beams $L_1$ and $L_2$, while being kept at a predetermined distance from the glass substrate 20 on the turntable by a controller (not shown).

Figure 12:
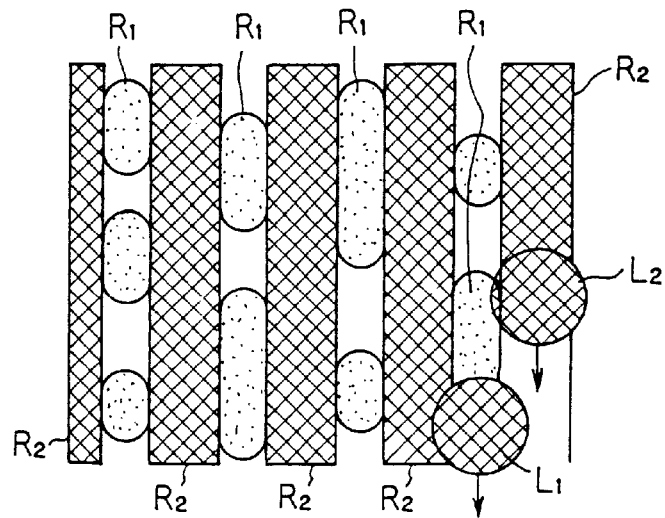
FIG. 12 is a plan view of the essential portion of the glass substrate, showing the exposure of the predetermined area of the photoresist layer formed on the glass substrate.

In the method according to the present invention, a portion of the photoresist 21 corresponding to the land 11 is exposed to the first laser beam $L_1$, and as shown in FIG. 12, each of areas $R_1$ of the photoresist 21 between the pits 10 formed in parallel in the direction of track, is exposed to the first laser beam $L_1$. Also, each of areas $R_2$ of the photoresist 21 corresponding to areas between the pit trains formed in parallel in the direction of track width, is exposed to the second laser beam $L_2$.

Figure 13:
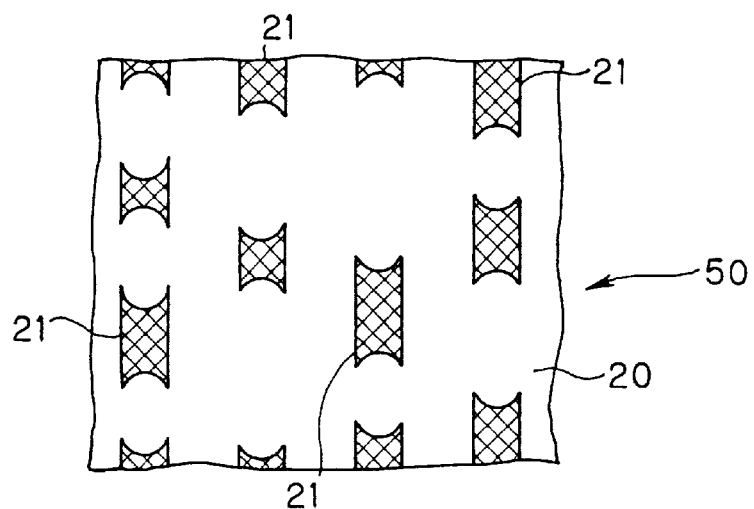
FIG. 13 is a plan view of an essential portion of a glass master having a photoresist layer left not removed on the glass substrate by development of the photoresist layer.
Figure 14:
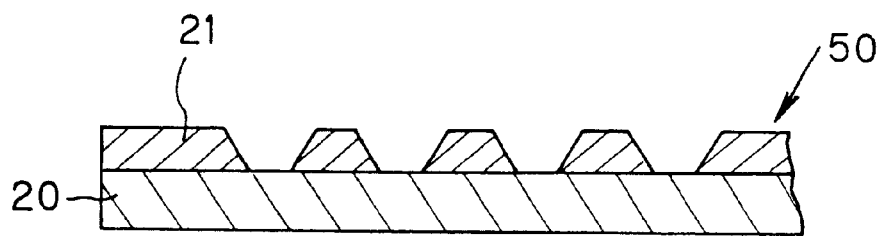
FIG. 14 is a sectional view of the essential portion of the glass master.

Next, at step S1 for forming the optical disc master, the photoresist layer 21 having predetermined areas thereof exposed to the laser beams are developed to remove the portions of the photoresist layer 21 exposed to the first and second laser beams $L_1$ and $L_2$ irradiated from on the glass substrate 20. Thereby, the portions of the photoresist layer 21 corresponding to the plurality of depressions on the optical disc 1, namely, the plurality of pits 10 are left as projections on the glass substrate 20 as shown in FIGS. 13 and 14.

At this time, the portions of the photoresist layer 21 corresponding to the lands 11 on the optical disc 1 are also removed while the portions of the photoresist 21 corresponding to the grooves 9 on the optical disc 1 are left on the glass substrate 20. Thus, at step S1, projections of the photoresist layer 21 are formed in the predetermined areas of the glass substrate 20 to yield a glass master 50.

Next, at step S2 for forming a stamper, the glass master 50 formed at step S1 above is used as will be discussed below.

Figure 15:
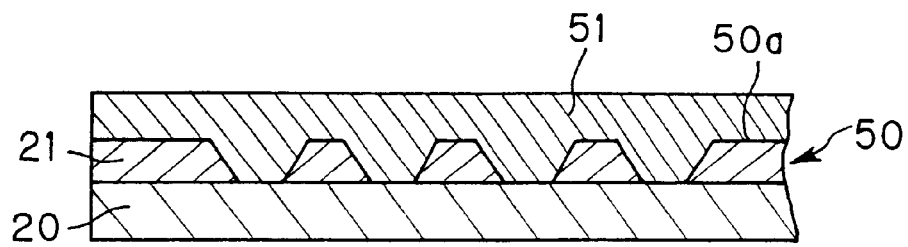
FIG. 15 is a sectional view of the essential portion of the glass master, showing nickel plating on the glass master.
Figure 16:
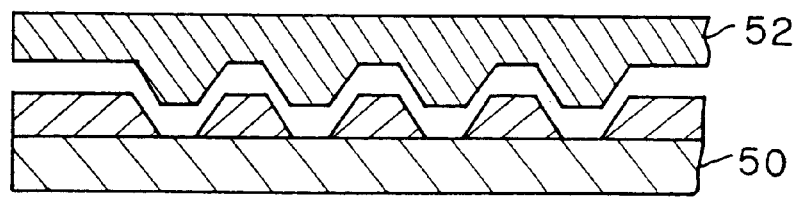
FIG. 16 is a sectional view of the essential portion of the glass master, showing the master stamper being separated from the glass master.

First at step S2, one main surface 50a of the glass master 50 having the photoresist layer 21 left in the predetermined areas is plated with nickel to form a first nickel layer 51 on the main surface 50a as shown in FIG. 15. Thereafter, the first nickel layer 51 is separated to form a master stamper 52 as shown in FIG. 16. Thus, one main surface 52a of the master stamper 52 will have formed thereon an inverted one of the pattern of depressions and projections formed on the glass master 50.

Figure 17:
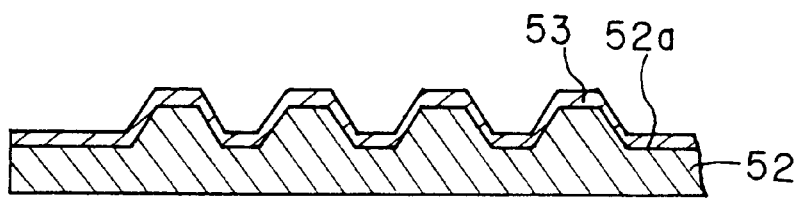
FIG. 17 is a sectional view of the essential portion of a glass stamper, showing a separation coating provided on the master stamper.

Then, as shown in FIG. 17, the main surface 52a of the master stamper 52 is subjected to an acid treatment using a dichromate solution to form a separation film 53 on the main surface 52a of the master stamper 52.

Figure 18:
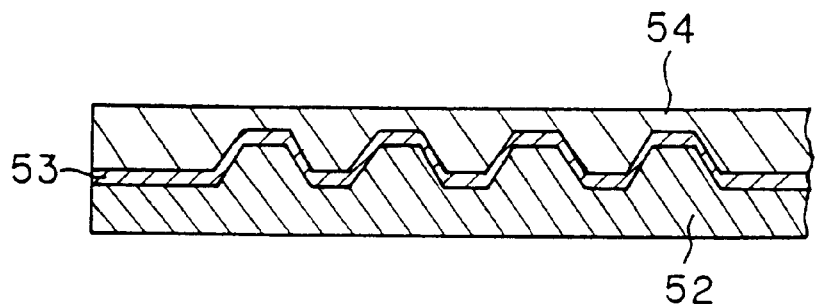
FIG. 18 is a sectional view of the essential portion of the master stamper, showing nickel plating on the separation coating on the master stamper.
Figure 19:
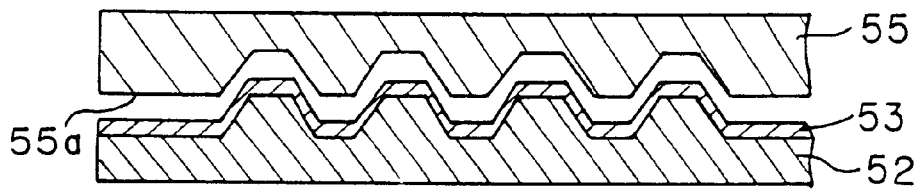
FIG. 19 is a sectional view of the essential portion of the master stamper, showing the mother stamper being separated from the master stamper.

Next, as shown in FIG. 18, the separation film 53 on the main surface 52a of the master stamper 52 is plated with nickel to form a second nickel layer 54. Thereafter, the second nickel layer 54 is separated to form a mother stamper 55 as shown in FIG. 19. Thus, the mother stamper 55 will have formed on one main surface 55a thereof a pattern of depressions and projections resulted from inversion of the pattern of depressions and projections on the master stamper 52, namely, a same pattern of depressions and projections as that formed on the glass master 50.

At this time, more than one such mother stamper 55 should desirably be prepared using the master stamper 52 to enable step S3 to be effected many times, which will be discussed below. This will greatly contribute to a manufacture of the optical disc 1 with a considerably improved productivity.

Figure 20:
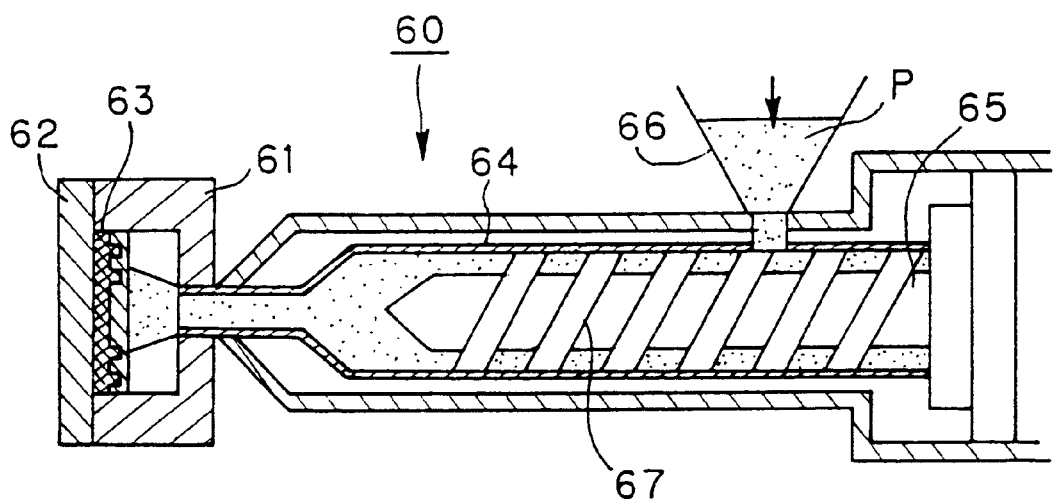
FIG. 20 is a sectional view of an essential portion of an injection molding machine used to implement the method of the present invention.

Next, at step S3, the mother stamper 55 formed at step S2 and an injection molding machine 60 as shown in FIG. 20 are used to form an optical disc substrate. The injection molding machine 60 comprises a cavity 63 consisting of a fixed mold 61 and a moving mold 62 movable towards and away from the fixed mold 61, a heating barrel 64 coupled to the cavity 63 and charged with a molten resin P, a d a piston 65 to knead the resin P filled in the heating barrel 64 and inject the molten resin P into the cavity 63. The injection molding machine 60 further comprises a hopper 66 to charge the heating barrel 64 with the resin P, and also a screw channel 67 formed in the inner wall of the heating barrel 64.

In this injection molding machine 60, the resin P charged in the heating barrel 64 from the hopper 66 is extruded by the piston 65 and injected into the cavity 63. At this time, the resin P is well kneaded due to the screw channel 67 formed in the inner wall of the heating barrel 64. The piston 65 in this injection molding machine 60 is driven hydraulically.

In this injection molding machine 60, the mother stamper 55 formed as mentioned in the foregoing is attached on one main surface of the fixed mold 61 forming the cavity 63. At this time, the mother stamper 55 has one side thereof, on which the pattern of depressions and projections are formed, directed inwardly of the cavity 63.

In the injection molding machine 60, the moving mold 62 is moved towards the fixed mold 61 on which the mother stamper 55 is installed, to form the cavity 63. The molten resin P is injected and filled into the cavity 63. Then, the fixed and moving molds 61 and 62 are cooled to cool and solidify the resin P in the cavity 63. Thereafter, the moving mold 62 is moved away from the fixed mold 61 for removal of the cooled and solidified resin P from inside the cavity 63.

Thus, there is yielded an optical disc substrate 2 having the pattern of depressions and projections replicated thereon from the mother stamper 55. Therefore, the optical disc substrate 2 will have an inverted one of the pattern of depressions and projections on the mother stamper 55. In other words, the optical disc substrate 2 thus formed will have an inverted one of the pattern of depressions and projections formed on one main surface of the glass master 50.

Next, at step S4 for forming layers on the optical disc substrate 2, a light-transparent layer 5 and other layers are formed on one main surface 2a of the optical disc substrate 2 formed as having been described in the foregoing. More particularly, at step S4, a reflective layer 3 is first formed on the one main surface 2a of the optical disc substrate 2 on which the pattern of depressions and projections is formed. The reflective layer 3 is formed from aluminum to a thickness of about 60 nm, for example.

Next, a first dielectric layer 6a is formed on the reflective layer 3. The first dielectric layer 6a is made from a mixture of ZnS and $SiO_2$ to a thickness of about 18 nm, for example. Then, a recording layer 7 is formed on the first dielectric layer 6a. The recording layer 7 is formed from a phase-change material such as previously mentioned GeSbTe or similar to a thickness of about 24 nm. Next, a second dielectric layer 6b is formed, on the recording layer 7, from the material and to the thickness, both mentioned concerning the first dielectric layer 6a.

Next, the light-transparent layer 5 is formed on the second dielectric layer 6b. This light-transparent layer 5 may be formed from a light-transparent resin by a so-called 2P (photo polymerization) method, for example. Also, The light-transparent layer 5 should desirably be formed to a thickness of 0.3 mm or less, or preferably to a thickness of 0.1 mm or so. Thus, even when the reading or writing light is irradiated through an optical system of a large NA, the previously mentioned problems will not take place but quality write and read can be made with respect to the optical disc thus produced.

As having been described in the foregoing, in the method according to the present invention, the first and second laser beams $L_1$ and $L_2$ are irradiated to portions corresponding to the pit trains on the optical disc to form the glass master 50. In this case, microscopic projections are formed on the glass substrate 20 as unexposed portions of the photoresist layer 21 corresponding to the pits 10.

Therefore, in this method, portions corresponding to the pits on the optical disc are formed as microscopic projections on the mother stamper 55 used in the injection molding. Therefore, in the method according to the present invention, the resin can easily be applied onto a portion corresponding to the pit 10 and the portion can be replicated with a high accuracy of replication which will not be deteriorated.

In the method according to the present invention, a portion corresponding to the pit 10 and that corresponding to the groove 9 are formed as photoresist layer 21 on the glass substrate 20. In other words, a portion of the main surface around the land 11 and that around the pit 9 correspond to exposed portions of the glass substrate 20 of the glass master 50.

Namely, in this method, the width of a signal recording surface of the optical disc is that of an exposed area on the photoresist layer 21 of the glass master 50. In this case, when the track pitch is limited to a predetermined value, a sufficiently wide signal recording surface is available within the limited track pitch. On the contrary, when the signal recording surface of the optical disc is to be formed from an unexposed area on the photoresist layer 21 of the glass master 50, it is required to expose at least a portion of the photoresist layer 21 included within the track pitch and equivalent to the diameter of a spot of light. Therefore, in this case, a sufficiently wide signal recording surface is not available within the track pitch.

Because an exposed area on the photoresist layer 21 is formed as the signal recording surface, a large width of signal recording surface within the track pitch is available to such an extent that the width of the photoresist layer 21 is generally zero. Therefore, the method of the present invention is suitably for manufacturing an optical disc having a track pitch decreased for a higher recording density. More particularly, when a laser beam having a wavelength of 351 nm and an optical system including an objective lens having a numerical aperture (NA) of 0.90 are used to form grooves at a track pitch of 0.5 $\mu$m, the minimum width of exposed glass surface was 0.15 $\mu$m (exposed area). Thus, the maximum unexposed area of the photoresist layer 21 has a width of 0.35 $\mu$m. Since an exposed area as wide as 0.39 $\mu$m is possible with grooves formed at the same track pitch, a wider signal recording area is available by setting the width of signal recording surface as the width of exposed area rather than as the width of photoresist layer.

Further in this manufacturing method, the one main surface 20a of the glass substrate 20 of the glass master 50 corresponds to the signal recording surface on the optical disc 1. The surface of the glass substrate 20 on which the photoresist layer is to be formed is highly mirror-finished. Therefore, in this method, the signal recording surface is a replication of the one main surface 20a of the glass substrate 20. Thus, the signal recording surface is highly mirror-finished.

On the contrary, when a portion corresponding to the signal recording surface of the optical disc 1 is a main surface of the photoresist layer 21 on the glass master 50, the main surface of the photoresist layer 21 will be replicated as a signal recording surface. The main surface of the photoresist layer 21 has a roughness (as RSM value in a direction perpendicular to the surface) double that of one main surface of the glass substrate 20. Therefore, since according to the present invention, a signal recording surface is formed by replication of the surface of the glass substrate 20, it is possible to produce an optical disc having an extremely smooth signal recording surface. Therefore, the method of the present invention permits to produce an optical disc 1 incurring less noises caused by the roughness of the signal recording surface and having a good CN ratio.

By the way, some track pitches are possibly different from a predetermined track pitch in some cases during the aforementioned step S1 for forming glass master. However, even if such uneven track pitches take place, the first laser beam $L_1$ can be irradiated in a predetermined width so that the method of the present invention permits to maintain a predetermined width of signal recording surface.

On the contrary, when an unexposed area on the photoresist layer 21 of the glass master 50 is made as a signal recording area on the optical disc, the width of the unexposed area will define a width of the signal recording surface. In this case, the width of the unexposed area is a subtraction of an exposed area width from the track pitch width, so that any uneven track pitch, if any, will cause the signal recording area to have an uneven width. As a result, signal cannot stable be read from the signal recording surface of an optical disc thus produced.

The method according to the present invention provides an optical disc 1 form which signal can stably be read since the signal recording surface width will not vary.

The method of manufacturing optical recording medium according to the present invention is not limited to a method in which a mother stamper formed by replicating a master stamper is used in injection-molding of a resin to form a resin substrate as having been described. Namely, the optical recording medium manufacturing method of the present invention may use a stamper formed by repeating replication of the master stamper 52 an odd number of times to provide a mother stamper for injection-molding of an optical disc.

In this case, the mother stamper 55 has a same pattern of depressions and projections as that formed on one main surface of the glass master 50. As in the foregoing, this mother stamper can be used in injection-molding to form the optical disc substrate 2.

Embodiments:

Optical discs were actually produced as embodiments of the present invention having been described in the foregoing, and their characteristics were evaluated. Conventional types of optical disc were also produced for comparison with the embodiments of the present invention.

Embodiment 1:

A substrate shown in Table 1 was used to produce an optical disc as embodiment 1.

TABLE 1

| Material | Polycarbonate |
| Pit depth | 100 nm |
| Thickness | 1.2 mm |
| Molding temperature | 130° C. |
| Stamper | Mother stamper |

A reflective layer and recording layer of aluminum were formed on one main surface of the substrate on which pits and grooves were formed, and further a light-transparent layer was formed on the recording layer.

Embodiment 2:

The so-called 2P (photo polymerization) method was adopted to mold a layer of an ultraviolet-curable resin on a glass substrate to form a disc substrate. The other respects of this embodiment are similar to those of the embodiment 1. The 2P method is such that the ultraviolet-curable resin charged between one main surface of the glass substrate and mother stamper is exposed to ultraviolet rays while being pressed, to solidify the resin. Using this 2P method, a pattern of depressions and projections formed on the mother stamper can be generally completely replicated to the disc substrate.

COMPARATIVE EXAMPLE 1

An optical disc 1 was produced in a same manner as the embodiment 1 provided that a master stamper prepared using a glass substrate formed by the conventional optical disc manufacturing method was used to form a substrate. In this example, portions of the resin corresponding to pits on the optical disc were exposed to a single laser beam and formed as depressions on the glass master. Therefore, the portions of the master stamper corresponding to the pits on the optical disc were microscopic depressions.

COMPARATIVE EXAMPLE 2

An optical disc 1 was produced in a same manner as the embodiment 1 provided that a master stamper prepared using a glass substrate formed by the conventional optical disc manufacturing method was used to form a substrate. In this example, portions of the resin corresponding to pits on the optical disc were exposed to a single laser beam and formed as depressions on the glass master. Therefore, the portions of the master stamper corresponding to the pits on the optical disc were microscopic depressions.

Evaluation of disc characteristics:

The embodiments 1 and 2 and comparative examples 1 and 2 prepared as in the above were evaluated for the accuracy of replication of the pit trains by measuring the depth of pits formed in the substrate. Their writing/reading characteristics were evaluated by measuring the jitter of the optical discs.

For these evaluations, a signal was written and read with respect to each of the optical discs under the conditions as shown in Table 2.

TABLE 2

| Written signal | Modulation code | EFN |
| | Linear density | 0.187 μm/bit |
| | Track pitch | 0.50 μm |
| Writing optical system | Writing light wavelength | 351 nm |
| | Objective lens NA | 0.9 |
| Reading optical system | Reading light wavelength | 640 nm |
| | Objective lens NA | 0.942 |

The measured jitters of the optical discs are shown in Table 3. Note that the jitter measurement was done without defocusing and substrate skew. The jitter is a position error at a conversion point. The smaller the jitter, the better the signal quality is.

TABLE 3

| Sample | Embodiment 1 | Embodiment 2 | Comparative example 1 | Comparative example 2 |
|---|---|---|---|---|
| Shutter value (%) | 7.0 | 6.8 | 6.0 | Unmeasurable |

As seen from Table 3, no sufficient read signal could be obtained from the comparative example 2. This is because the resin could not be charged in the microscopic depressions on the mother stamper, causing a poor replication. The measured pit depth in this optical disc was only 20 nm or so.

The measured jitters of the embodiments 1 and 2 are generally same as that of the comparative example 1, which proves that they can provide read signals of sufficient level. Also, the pit depth of them is approximately 100 nm. Table 3 also shows that there is little difference in jitter between the embodiment 1 produced by the injection molding process and the embodiment 2 produced by the 2P method which permits a generally complete replication of a pattern of depressions and projections. This shows that using a mother stamper prepared by the method according to the present invention, the pattern of depressions and projections can be replicated very accurately also by the injection molding.

As having been described in the foregoing, the optical recording medium according to the present invention has depressions formed deep from a same height as the main surface of the projections. When formed together with the projections, the depressions can be formed with a high accuracy. Thus, quality read signal can be obtained from the optical recording medium of the present invention.

The optical recording medium manufacturing method according to the present invention uses a mother stamper formed by repeating the replication of a master stamper an odd number times to form a resin substrate. The mother stamper has provided thereon projections resulting from depressions formed on a master. Thus, in this method, a train of microscopic depressions on a glass master is formed as a train of microscopic projections on the mother stamper. Therefore, the method according to the present invention permits to mold a train of depressions on the glass master with a high accuracy of replication to positively form a resin substrate having a train of microscopic depressions.

What is claimed is:

1. A method of manufacturing an optical recording medium, comprising the steps of:

forming a photoresist layer on a substrate;

exposing a predetermined area of the photoresist layer formed on the substrate to form a plurality of trains of depressions in the photoresist layer;

removing the photoresist layer between the adjoining depression trains to form a master;

plating the master with a metal;

separating the metal coating to form a master stamper;

replicating the master stamper repeatedly an odd number of times to form a mother stamper;

replicating the mother stamper to form a resin substrate; and forming at least a light-transparent layer on a surface of the resin substrate on which the mother stamper has been replicated.

2. The method according to claim 1, further comprising the step of:

forming grooves in line with the train of depressions.

3. The method according to claim 2, wherein the substrate is exposed at the bottoms of the grooves and depressions, respectively.

4. The method according to claim 1, wherein the photoresist layer is a positive one.

5. The method according to claim 4, further comprising the steps of:

forming the depressions by exposing the photoresists layer to a first light; and removing the photoresist layer between the trains of depressions by exposing the photoresist layer to a second light.

6. The method according to claim 5, wherein the first light and second light are obtained by splitting a light from a single source and irradiated to the photoresist layer through a same objective lens.

* * * * *